United States Patent [19]

Chang

[11] 3,736,577

[45] May 29, 1973

[54] DOMAIN TRANSFER BETWEEN ADJACENT MAGNETIC CHIPS

[75] Inventor: Hsu Chang, Yorktown Heights, N.Y.

[73] Assignee: International Business Machines Corporation, Armonk, N.Y.

[22] Filed: Dec. 31, 1970

[21] Appl. No.: 103,047

[52] U.S. Cl. .....................340/174 TF, 340/174 AC, 340/174 PM, 340/174 SR

[51] Int. Cl. ..........................G11c 21/00, G11c 11/14

[58] Field of Search ....................340/174 TF, 174 SR

[56] References Cited

UNITED STATES PATENTS

| | | | |
|---|---|---|---|
| 3,543,255 | 11/1970 | Morrow et al. | 340/174 TF |
| 3,596,261 | 7/1971 | Perneski | 340/174 TF |
| 3,508,225 | 4/1970 | Smith | 340/174 |

*Primary Examiner*—James W. Moffitt
*Attorney*—Hanifin and Jancin and Jackson E. Stanland

[57] ABSTRACT

A structure for cylindrical, single wall magnetic domains using a plurality of magnetic chips to achieve large size devices, such as long shift registers. The magnetic chips are pieced together and domain propagation from one chip to another is effected by an interaction between domains located on adjacent chips. The domains themselves are not able to cross the boundary between adjacent chips. Propagation means in one chip brings domains representing information bits in that chip closely enough to a second chip that these domains will magnetically interact with other domains in the second chip, causing the domains in the second chip to then propagate as information bits. Consequently, a large device is comprised of a number of smaller segments which cooperatively interact. This overcomes the constraint of bit capacity limitation due to the dimensions of magnetic chips. This also facilitates the combined use of chips with different properties as designed for different functions.

22 Claims, 3 Drawing Figures

INVENTOR
HSU CHANG

BY J. E. [signature]

AGENT

DOMAIN TRANSFER BETWEEN ADJACENT MAGNETIC CHIPS

BACKGROUND OF THE INVENTION

1. Field of the Invention

This invention relates to domain transfer from one magnetic chip to another, thereby achieving large devices without the necessity of a single, large magnetic chip.

2. Description of the Prior Art

Various devices using cylindrical, single walled domains (bubble domains) are known in the art, as can be seen by referring to an article by A. H. Bobeck, appearing in the "IEEE Transactions on Magnetics", No. 3, page 544, September, 1969. In these devices, cylindrical domains are propagated throughout a magnetic chip by various propagation means. The propagation means can comprise overlays of soft magnetic material or conductor circuits. Localized magnetic fields are created by the propagation means which move the domains in desired directions across the magnetic chip.

Some of these devices involve interaction between domains located on a single magnetic chip. For instance, a cylindrical domain flip-flop using domain/-domain interaction is described by Perneski in an article entitled "Propagation of Cylindrical Magnetic Domains", appearing in the "IEEE Transactions on Magnetics", Volume MAG-5, No. 3, September 1969, on page 557. In another example using interaction between domains, an asynchronous magnetic circuit is described in U.S. Pat. No. 3,480,925. In that patent, two magnetic sheets are used, and there is interaction between permalloy domains (domains with in-plane magnetization) in one magnetic sheet and domains in the second magnetic sheet. This asynchronous circuit uses the repulsion between domains to queue the domains. The presence and absence of domains, representing information, can not be done in a single sheet because information represented by the absence of domains would be lost. The presence of the domain in the second sheet corresponds to the absence of a domain in the first sheet. The net result is that, even though information is represented as the presence of domains in both the first and second sheets, information is detected in terms of the presence and absence of domains in the first sheet.

While the mutually repelling forces existing between domains are known, devices which utilize these effects and others are limited in capacity by the size of the magnetic chip which supports the domains. It is difficult to grow large size magnetic chips suitable for bubble domain devices, and the capacity per magnetic chip is limited by the dimensions of the magnetic chip. For instance, provision of long shift registers is difficult with present technology, since length can be achieved only by recirculating propagation channels on a single magnetic chip. Consistent with the present techniques for fabricating magnetic chips suitable for bubble domain devices, it is desirable to be able to provide devices which have greater numbers of bits of storage. The present invention is directed to that problem. It utilizes a plurality of magnetic chips to provide large devices.

Accordingly, it is the primary object of this invention to provide cylindrical domain devices larger than those which are presently limited by the size of the magnetic chip used.

It is another object os this invention to provide large magnetic devices comprising segments which have different material properties.

It is still another object of this invention to provide improved cylindrical domain devices in which the various portions of the devices can have properties tailored to specific needs.

The foregoing and other objects, features, and advantages of the invention will be apparent from the following more particular description of the preferred embodiments of the invention as illustrated in the accompanying drawings.

SUMMARY OF THE INVENTION

Large cylindrical domain devices are provided by utilizing a plurality of magnetic chips in which the domains can be propagated. These magnetic chips are brought into contact with one another to produce a large magnetic "sheet" having substantially one plane but being comprised of a plurality of individual magnetic chips.

Each magnetic chip is provided with various propagation means which bring domains in one chip close to the boundary between that chip and the adjacent chip. Located on the adjacent chip is a domain generator which continually produces domains. These domains are propagated close to the boundary of the first magnetic chip. The propagation means for the domains can overlap the boundaries between magnetic chips, even though the domains themselves cannot propagate across these boundaries.

Domains in the first magnetic chip, representing information bits, propagate to an area of the chip close to the boundary between that chip and the adjacent chip.

Domains in each chip are brought to an "interaction zone" which exists across the boundary of that chip and the adjacent chip. In the interaction zone, domains from one chip magnetically interact with domains in the adjacent chip to influence the domains in the adjacent chip. Depending on the presence or absence of domains in the first chip, the domains in the second chip will be directed into one of two paths.

Thus, assume that domains in the first chip represent information bits. The presence of a domain represents a "1", while the absence of a domain represents a "0". In the second chip, a domain generator continually provides domains (one each cycle), into the interaction zone between that chip and the first chip. Depending upon whether or not a domain in the first chip is present in the interaction zone, the domain in the second chip will follow one of two paths. If no domain is present in the first chip, the domain in the second chip will travel to a domain buster. If a domain is present in the first chip, the domain in the second chip will be deflected and will propagate towards a third chip. Meanwhile, the domain in the first chip which was unable to cross the boundary between the first and second chip is directed to a domain buster on that chip, after passage through the interaction zone. Thus, domain transfer between chips is effected by magnetically coupling domains in one chip to domains in another chip.

The magnetic chips which are pieced together to form a large "sheet" can be of the same material or different material. In addition, their magnetic properties can be tailored to produce devices having portions with different characteristics. For instance, a first chip can be used for manipulation of data, while a second chip is used for display purposes.

As an alternative, a substrate can be prepared having numerous small "substrates" of different orientation thereon. Deposition of magnetic chips onto these "substrates" will produce chips of different properties. In this way, a hybrid thin film structure comprising numerous small chips is provided.

Because the domains interact over a distance of several domain diameters (strong interactions occur for separations of the order of 3 or 4 domain diameters), the interface boundary between adjacent magnetic chips is not critical. That is, the magnetic chips do not have to be finely polished to produce perfectly smooth interfaces. The propagation means used for each magnetic chip can be any of a number of known means. In addition, the bias magnetic field normal to the magnetic chips, can be the same for all chips or different for individual chips. This allows optimization of the devices in each chip.

DETAILED DESCRIPTION OF THE PREFERRED EMBODIMENTS

Figure 1:
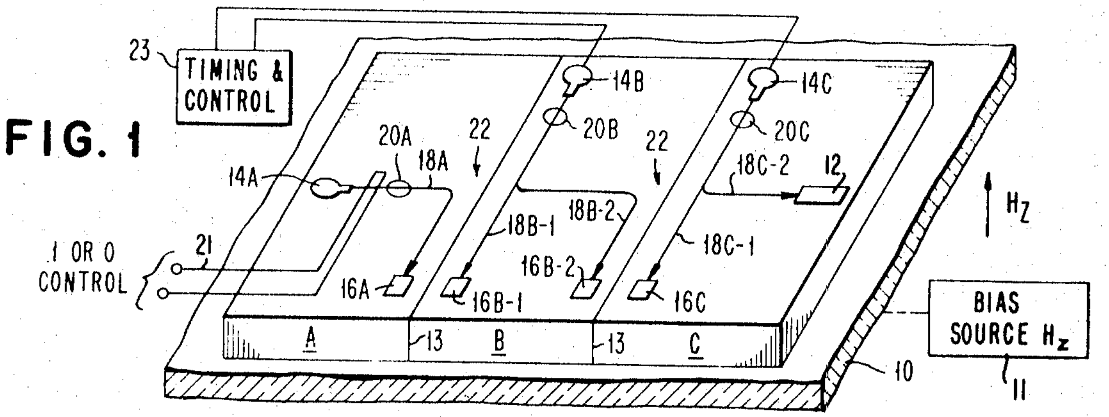
FIG. 1 is a schematic illustration of a cylindrical domain device comprising three magnetic chips supported by a substrate.

FIG. 1 illustrates a cylindrical domain device comprising three magnetic chips A, B, and C. These magnetic chips are crystals which can sustain bubble domain propagation. They are well known and can be, for instance, orthoferrites or garnets. They can be thin films or bulk crystals. These magnetic chips are supported by substrate 10, which is usually an insulating material. A bias source 11, such as a coil or a permanent magnet, provides stabilizing field $H_z$ normal to the plane of the magnetic chips A, B, and C.

Assuming that chip A is the first to receive information, information in the form of bubble domains is to be transferred from chip A to the detector 12 located on chip C. Since the cylindrical domains themselves are not able to traverse the physical boundaries 13 between the chips, the invention provides a mechanism for information transfer between chips. Consequently, increased data capacities result even though magnetic chips A, B, and C might be quite small.

Located on the magnetic chips are various bubble domain generators 14A, 14B, and 14C. Also located on the magnetic chips are bubble domain collapsers 16A, 16B–1, 16B–2, and 16C. Means are provided for propagating the domains along the paths indicated by arrows 18A, 18B–1, 18B–2, 18C–1, and 18C–2. The various domain generators 14A, 14B, and 14C produce cylindrical domains 20A, 20B, and 20C, respectively. These generators are well known in the art, and they will produce a domain once during each cycle of the domain propagation. For instance, the domain generator can be that described in copending application Ser. No. 103,048, filed Dec. 30, 1970 now U.S. Pat. No. 3,662,359 and assigned to the same assignee. Also, the generators could be rotating permalloy disks, as described in the aforementioned Perneski article.

In operation, data produced by generator 14A is indicated by the presence or absence of bubble domains 20A in chip A. An inhibit winding 21 is used to prevent generator 14A from emitting a bubble if a zero bit is desired. Domains 20A propagate along path 18A to an interaction zone 22. In the interaction zone, a domain in chip A (or the absence of a domain) will magnetically interact with domain 20B produced by generator 14B. Domains 20B will be present in the interaction zone 22 during each cycle, since no inhibit winding is connected to the output of generator 14B.

If there is a domain 20A in the interaction zone when the domain 20B arrives in the zone, mutual repulsion between these domains will cause domain 20B to be deflected from its normal path 18B–1 to path 18B–2. If there is no domain present from generator 14A in the interaction zone between chips A and B when domain 20B enters this interaction zone, domain 20B will not be deflected into path 18B–2, but will continue its normal travel along path 18B–1, which will take it to bubble collapser 16B–1. Thus, the presence of domains 20A in magnetic chip A will cause domains 20B in magnetic chip B to be deflected from their preferred path 18B–1 to the data path 18B–2. The presence of a domain 20A (representing a binary 1) in magnetic chip A will cause a domain 20B to be a binary 1 in magnetic chip B. Consequently, the presence or absence of domains in chip A is duplicated as the presence or absence of domains 20B in path 18B–2 of chip B.

Between chips B and C there is another interaction zone 22 located in the proximity of the boundary between these magnetic chips. As with the situation described above, domains propagating in path 18B–2 are information-bearing domains.

The presence or absence of such domains will be present in interaction area 22 between magnetic chips B and C. Since domains 20C are produced every cycle of domain generator 14C, the presence of a magnetic domain 20B on path 18B–2 will cause a domain 20C to follow path 18B–2, rather than the usually preferred path 18C–1. Finally, these domains are brought to a detector 12 located on chip C.

Of course, the entire device could comprise more than three magnetic chips, and various propagation schemes can be envisioned in which information is circulated, etc. Magnetic chips A, B, and C can be bulk crystals or thin films grown on the substrate. In the case of bulk crystals, these crystals can be ultrasonically cut to produce a boundary and then the crystals are mounted on a common substrate 10. Since the domains interact over a distance of several domain diameters (within three or four domain diameters the interaction is strong), the smoothness of the boundary is not critical. For instance, irregularities of a few microns on the edges of adjacent chips will not interfere with the cooperative interaction between domains of approximately 5 microns in each of the adjacent chips.

Magnetic chips can be grown on a substrate having portions of different orientation. The boundaries between the chips grown this way will correspond to the boundaries between bulk crystals pieced together.

The magnetic chips A, B, and C do not have to be comprised of the same material, nor do they have to have the same properties, such as mobility and bit density. Further, the same type of propagation means need not be used in each of the magnetic chips. It is only necessary that the magnetic domain (or no domain) arrive in the interaction zone 22 at the same time domains in the adjacent chip arrive in that interaction zone, in order to effect data transfer between magnetic chips. Timing and control circuit 23 provides pulses to synchronize the generators 14B and 14C with the control loop 21. Thus the data in chip A is transferred to chips B and C without clocking problems.

Figure 2:
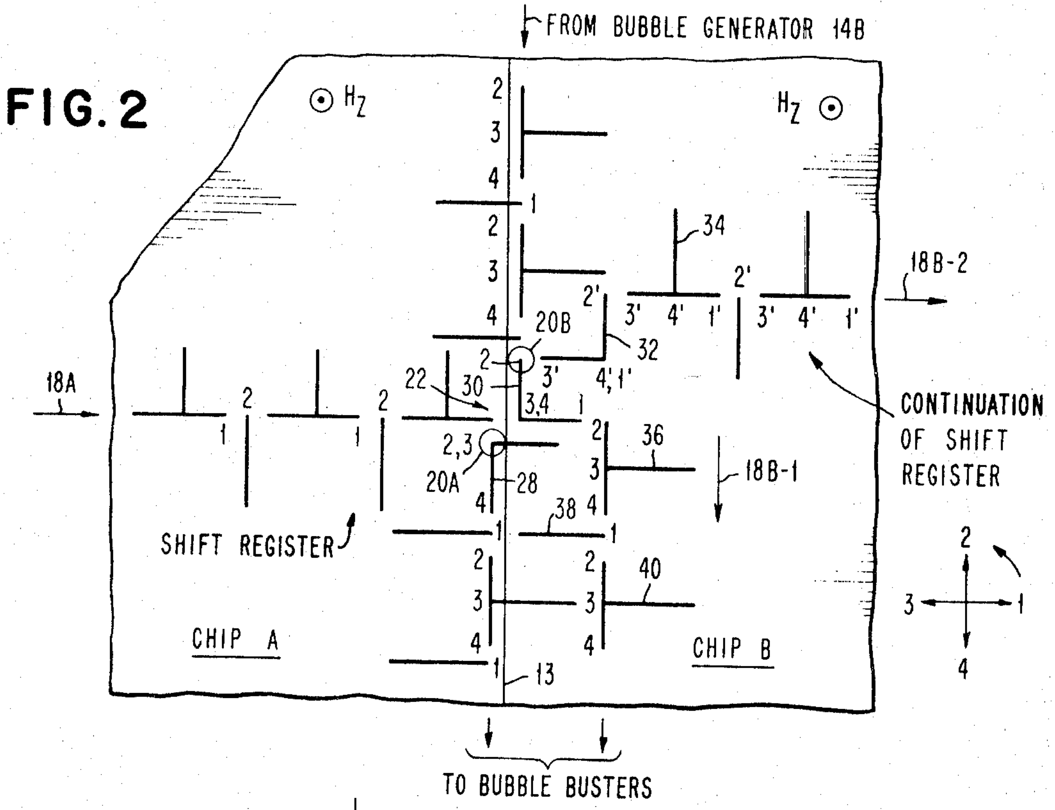
FIG. 2 shows a T and I bar propagation means for information transfer between any two of the chips of FIG. 1.

FIG. 2 shows a T and I bar arrangement for effecting data transfer between chip A and chip B. This is a conventional permalloy (or other soft magnetic material) structure. The boundary between chip A and chip B is again designated by line 13 and the same reference numerals are used where possible. Although bubble domains cannot cross this boundary (Exchange coupling of magnetization vectors in the wall of the domain depends upon the presence of magnetic material. At the interface 13 between chips, there is a discontinuity and exchange coupling ceases.), the propagation means (T & I bars) can overlap the boundary 13.

In chip A, domains 20A travel from left to right in the direction of arrow 18A. These domains can be produced by a controlled generator 14A or they can be data bits which have been effected in chip A by another adjacent magnetic chip.

In chip B, domains 20B are produced in each cycle of rotating magnetic field H, which is the in-plane field for domain propagation. Domains 20B are produced continually by generator 14B, and these domains will follow a path 18B–1 in the absence of a domain 20A in interaction zone 22. Domains 20A on chip A always propagate to a domain buster 16A. Domains 20B on chip B will propagate to domain buster 16B–1 only if they are not repelled along path 18B–2 by the presence of a domain 20A in the interaction zone 22 between chips A and B.

More specifically, when a bubble domain 20A is propagated to close proximity to the boundary 13 and reaches position 2, 3 on L bar 28, a domain 20B on position 2 of L bar 30 will be repelled, causing domain 20B to follow path 3', 4', 1', 2', on L bar 32. Domain 20B then follows the path 3', 4', 1' along T bar 34, after which it propagates in the direction of arrow 18B–2 toward magnetic chip C. If domain 20A is not in the interaction zone 22 between chips A and B when domain 20B arrives at position 2 on L bar 30, domain 20B will propagate to position 3, 4, 1 of L bar 30 and will then move downward in the direction of arrow 18B–1 along T and I bar elements 36, 38, 40, etc.

It is to be understood that propagation field H is a rotating, in-plane magnetic field existing in both chips A and B. Of course, this could be two separate magnetic fields synchronized so as to provide movement to corresponding positions in each magnetic chip at the same time. Further, the bias field $H_Z$ is directed normal to each magnetic chip.

Figure 3:
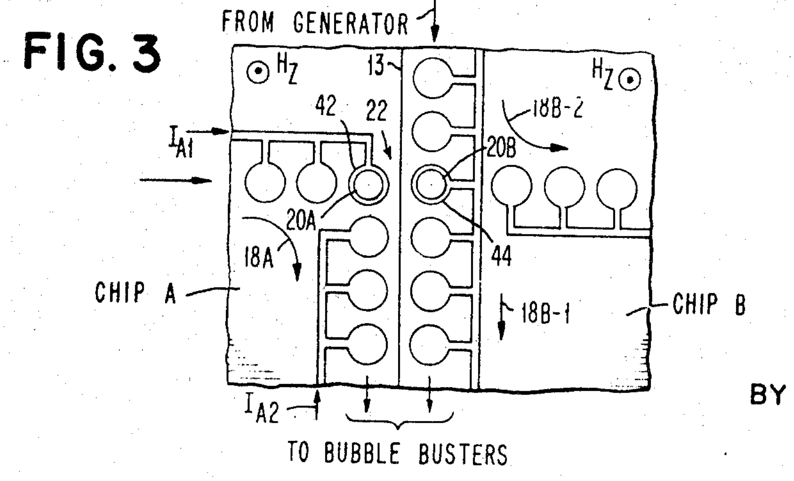
FIG. 3 is an alternate embodiment of the mechanism for transferring information from one chip to another, using conductor loop circuits.

FIG. 3 shows an embodiment of the data transfer mechanism from one chip to another using conductor loop propagation means. Of course, knowledge of the principles explained by reference to FIGS. 1–3 will enable one to design other bubble domain propagation means (such as herringbone structures or angelfish patterns) suitable to effect data transfer from one chip to another.

Data to be transferred from chip A to chip B moves in the direction of arrow 18A due to the magnetic fields produced by currents $I_{A1}$ and $I_{A2}$. As with the previous figures, the same reference numerals are used whenever possible to aid clarity. The domains 20A enter interaction zone 22 when they are propagated to conductor loop 42. Correspondingly, domains 20B on chip B enter interaction zone 22 when they are propagated to loop 44. If a domain 20A is in conductor loop 42 at the same time a domain 20B is in loop 44, domain 20B will be propagated in the direction of arrow 18B–2 and will continue toward magnetic chip C. If a domain 20A is not present in loop 42 (binary bit 0) at the same time a domain 20B is in loop 44, domain 20B will continue its downward movement in the direction of arrow 18B–1 to domain buster 16B–1. All domains 20A propagate in the direction of arrow 18A to domain buster 16A.

Whereas the individual magnetic chips A, B and C may have limited size due to fabrication limitations, the combined device comprising chips A, B and C has a large bit capacity since each magnetic chip cooperates with the other to provide an enlarged device. For instance, a shift register having three portions will have a large bit capacity and will use magnetic chips previously thought unusable because of their size limitations.

In addition, the possibility of providing localized variations in magnetic properties in a large device exists, since each magnetic chip A, B, and C can have different properties. Whereas it has been known that bubble domains mutually repel one another, this is the first known exploitation of that idea to provide usable bubble domain devices using interactions between domains located on separate magnetic chips, where the data represented by a domain on one chip is transferred to another chip.

If desired, domains which have mutually interacted at one boundary can proceed to another boundary (instead of to a collapser) for additional interactions across the second boundary. Further, the magnetic chips can be adjacent at more than one boundary and the domains in any chip can be outputs of various devices on that chip, rather than being produced by a domain generator. Thus, the invention describes information transfer between separate magnetic chips by domain interaction across the boundaries between these chips.

What is claimed is:

1. A magnetic device for cylindrical magnetic domains, comprising:

a magnetic sheet comprised of a plurality of discrete magnetic chips adjacent one another, said domains being able to propagate in each said chip but not being able to propagate across the boundary between said chips;

means located in each chip for propagating domains to positions sufficiently near said boundary that domains in adjacent chips can magnetically interact with one another.

2. The device of claim 1, where said chips include domain generators for producing said domains.

3. The device of claim 1, where at least one of said chips includes a detector for sensing the presence and absence of domains in that chip.

4. A device for magnetic cylindrical domains, comprising:

a plurality of magnetic chips, sadi chips being adjacent one another and in substantially the same plane;

means for producing a bias magnetic field for stabilizing the domains in each magnetic chip;

means for creating information in a first one of said chips represented by the presence and absence of said domains in that chip;

means for propagating said domains in said first chip to the boundary of said first chip and a second chip, said domains being able to propagate in each said chip but not being able to propagate across the boundary between said chips;

means for producing domains in said second chip which magnetically interact with said information domains in said first chip, said interaction deflecting domains representative of said information in said first chip, thereby reproducing said information domains in said second chip.

5. The device of claim 4, where said chips are comprised of the same materials.

6. The device of claim 4, including means to detect said domains located on said chips.

7. The device of claim 4, where each chip includes means for propagating domains in that chip to the boundary between that chip and another chip, said domains and adjacent chips being brought sufficiently close to one another that there stray magnetic fields can interact with one another.

8. The device of claim 4, where said chips are thin films grown on a substrate.

9. A device for cylindrical, magnetic domains, comprising:

first and second magnetic chips, each of which is capable of supporting the propagation of said domains therein, said domains not being able to propagate from said first chip to said second chip;

means for propagating said domains in each chip to positions sufficiently close that domains in said first and second chips magnetically interact with one another, said interaction causing domains in said second chip to be spatially deflected.

10. The device of claim 9, wherein said first and second chips are adjacent at a side and are located in substantially the same plane.

11. The device of claim 9, where said second chip has a domain generator thereon which provides the domains for interaction with the domains in said first chip.

12. The device of claim 11, where said first and second chips have domain collapsers thereon for destroying domains in each chip after interaction therebetween.

13. The device of claim 9, where said propagation means is comprised of magnetic elements located on said chips, said elements being magnetized by a magnetic field in the plane of said chip.

14. A device for cylindrical magnetic domains, comprising:

a first magnetic chip in which first cylindrical domains can be propagated;

first propagation means for propagating said domains in said first chip, said propagation means terminating in a domain collapser;

a second magnetic chip in which second cylindrical domains can be propagated, said second chip being adjacent said first magnetic chip, there being a boundary between said chips across which said domains cannot propagate;

second propagation means for moving said second domains in said second chips, said second propagation means providing two paths for said domains;

means for producing a bias magnetic field for stabilizing the domains in said first and second chips;

said first and second propagation means moving said first and second domains to positions where said domains can magnetically interact with one another across said boundary, said interaction determining which of two paths said second domains will take in said second chip.

15. The device of claim 14, where said propagation means comprises magnetic elements located on said chips, said elements being magnetized by a propagation magnetic field in the plane of said chips.

16. The device of claim 14, where said propagation means comprises conductor loops having currents therein.

17. The device of claim 14, where one of said paths in said second chip terminates in a domain collapser.

18. The device of claim 14, where said second chip has a domain generator for producing said second domains, said generator being responsive to said propagation field.

19. The device of claim 14, where said first and second chips are thin films deposited on a substrate.

20. In an information transfer structure of the type wherein the presence and absence of magnetic bubble domains represent said information, a first and second magnetic chip each made of magnetic material and each supporting magnetic bubble domains therein, said chips being positioned adjacent to one another in substantially the same plane such that the magnetic bubble domains along adjacent edges of said chips will magnetically interact.

21. The structure of claim 20, where said chips are thin films grown on a common substrate.

22. The structure of claim 20, wherein each chip includes means for propagating domains in that chip to said adjacent edges.

* * * * *